(12) United States Patent
Choi et al.

(10) Patent No.: US 8,194,772 B2
(45) Date of Patent: Jun. 5, 2012

(54) CONSTELLATION ROTATION RELAY SYSTEM AND CONSTELLATION ROTATION RELAY METHOD

(75) Inventors: Young Gon Choi, Yongin-si (KR); Hyun Cheol Park, Daejeon (KR); Eung Sun Kim, Yongin-si (KR); Jin Sae Jung, Yongin-si (KR); Jung Ho Kim, Yongin-si (KR); Kyle Kim, Yongin-si (KR); Ji Hoon Lee, Yongin-si (KR); Sung Won Lee, Yongin-si (KR); Yong Sung Roh, Yongin-si (KR); Hae Lyong Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 11/708,457

(22) Filed: Feb. 21, 2007

(65) Prior Publication Data

US 2008/0064327 A1 Mar. 13, 2008

(30) Foreign Application Priority Data

Sep. 8, 2006 (KR) .................... 10-2006-0087005

(51) Int. Cl.
*H04B 7/02* (2006.01)
(52) U.S. Cl. ........ 375/267; 375/130; 375/260; 370/203; 370/208; 370/210; 370/329; 370/335
(58) Field of Classification Search .................. 375/146, 375/267; 370/328
See application file for complete search history.

(56) References Cited

U.S. PATENT DOCUMENTS

| | | | |
|---|---|---|---|
| 2004/0203911 A1 | 10/2004 | Masuda et al. | |
| 2005/0014464 A1 | 1/2005 | Larsson | |
| 2005/0163243 A1* | 7/2005 | Chung et al. | 375/267 |
| 2005/0281322 A1* | 12/2005 | Lee et al. | 375/146 |
| 2006/0056338 A1* | 3/2006 | Abe et al. | 370/328 |
| 2006/0140294 A1* | 6/2006 | Hottinen et al. | 375/260 |
| 2008/0144733 A1* | 6/2008 | ElGamal et al. | 375/267 |

FOREIGN PATENT DOCUMENTS

JP 2003-198442 7/2003

(Continued)

OTHER PUBLICATIONS

Cooperative diversity by relay phase rotations in block fading environments. Hammerstrom, I; Kuhn, M.; Wittneben, A.; Signal Processing Advances in Wireless Communications, 2004 IEEE 5th Workshop on Jul. 11-14, 2004 pp. 293-297.*

(Continued)

*Primary Examiner* — Eva Puente
*Assistant Examiner* — Eboni Hughes
(74) *Attorney, Agent, or Firm* — NSIP Law

(57) ABSTRACT

Provided is a constellation rotation relay system and constellation rotation relay method which can acquire full diversity gain by performing constellation rotation for a channel matrix in a relay network when configuring a virtual MIMO channel. The constellation rotation system includes a matrix creator for creating a symbol matrix by configuring a symbol transmitted in parallel from a source of a relay network; and a constellation rotation unit constellation rotating the symbol in the symbol matrix by adding a constellation rotation matrix to the created symbol matrix.

14 Claims, 5 Drawing Sheets

CONSTELLATION ROTATION SYSTEM 200

FOREIGN PATENT DOCUMENTS

KR    1020060041978    5/2006

OTHER PUBLICATIONS

Rankov, B.; Wittneben, A.; , "On the capacity of relay-assisted wireless MIMO channels," Signal Processing Advances in Wireless Communications, 2004 IEEE 5th Workshop on , vol., no., pp. 323-327, Jul. 11-14, 2004.*

Cooperative diversity by relay phase rotations in block fading environments. Hammerstrom, I.; Kuhn, M.; Wittneben, A.; Signal Processing Advances in Wireless Communications, 2004 IEEE 5th Workshop on Jul. 11-14, 2004 pp. 293-297.*

Ingmar Hammerstrom; "Cooperative Diversity by Relay Phase Rotations in Block Fading Environments" ;Fifth IEEE Workshop on Signal Processing Advances in Wireless Communications, Lisboa, Portugal, Jul. 11-14, 2004.

* cited by examiner

FIG. 3 i)

FIRST TIME SLOT

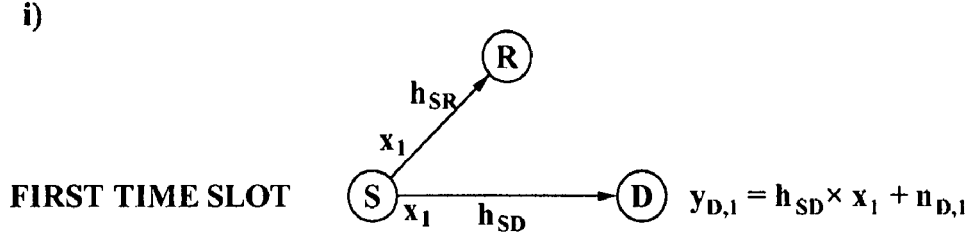

$y_{D,1} = h_{SD} \times x_1 + n_{D,1}$

SECOND TIME SLOT

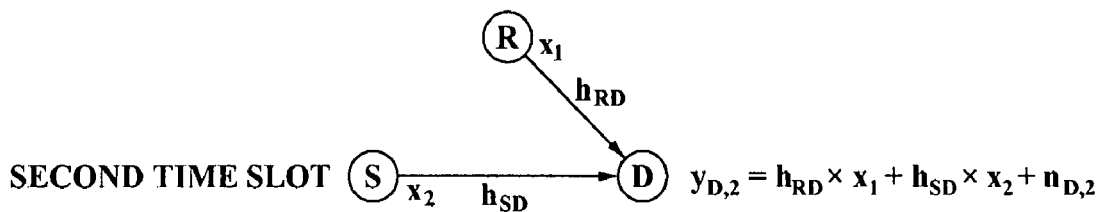

$y_{D,2} = h_{RD} \times x_1 + h_{SD} \times x_2 + n_{D,2}$ ii)

$$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} x_1 \\ x_2 \end{bmatrix} + \begin{bmatrix} n_{D,1} \\ n_{D,2} \end{bmatrix} \quad : \text{BEFORE CONSTELLATION ROTATION}$$

$$\begin{bmatrix} y_{D,1} \\ y_{D,2} \end{bmatrix} = \begin{bmatrix} h_{SD} & 0 \\ h_{RD} & h_{SD} \end{bmatrix} \odot \begin{bmatrix} x_1 \\ x_2 \end{bmatrix} + \begin{bmatrix} n_{D,1} \\ n_{D,2} \end{bmatrix} \quad : \text{AFTER CONSTELLATION ROTATION}$$

$$= \begin{bmatrix} \tilde{h}_{11} & \tilde{h}_{12} \\ \tilde{h}_{21} & \tilde{h}_{22} \end{bmatrix} \begin{bmatrix} x_1 \\ x_2 \end{bmatrix} + \begin{bmatrix} n_{D,1} \\ n_{D,2} \end{bmatrix}$$

CONSTELLATION ROTATION RELAY SYSTEM AND CONSTELLATION ROTATION RELAY METHOD

CROSS-REFERENCE TO RELATED APPLICATIONS

This application claims the benefit under 35 U.S.C. §119(a) of a Korean Patent Application No. 10-2006-0087005, filed on Sep. 8, 2006, in the Korean Intellectual Property Office, the entire disclosure of which is hereby incorporated by reference.

BACKGROUND OF THE INVENTION

1. Field of the Invention

The present invention relates to a constellation rotation relay system and a constellation rotation relay method thereof. More particularly, the present invention relates to a constellation rotation relay system and a constellation rotation relay method which can acquire full diversity gain by performing a constellation rotation process for a channel matrix in a relay network, when configuring a virtual multiple input multiple output (MIMO) channel.

2. Description of Related Art

A relay network is used for maintaining communication in a shadow region and extending a coverage area of a cell. Communication performance between a base station and a mobile station may be improved by employing a relay.

FIG. 1, parts i), ii), and iii) are diagrams illustrating an example of a protocol applied to a relay network in related art.

As illustrated in FIG. 1 parts i), ii), and iii), there is a MIMO, a single input multiple output (SIMO), and a multiple input single output (MISO) protocols provided in a conventional relay network.

In FIG. 1 parts i), ii), and iii), S, R, and D respectively indicate a source, a relay and a destination, and a dotted line indicates a transmission comprising different symbols.

FIG. 1 part i) relates to a MIMO protocol. A source in a first time slot transmits a first symbol to a relay and a destination. Also, the source in a second time slot transmits a second symbol to the destination, and the relay transmits the symbol, received in the first time slot, to the destination by applying an amplify-and-forward (AF) or a decode-and-forward (DF) function. In the AF function the received symbol is power amplified in the relay and then retransmitted. In the DF function, the received symbol is decoded and then re-encoded. The re-encoded symbol is then power amplified and transmitted.

FIG. 1 part ii) relates to a SIMO protocol. Operation in a first time slot is identical to the MIMO protocol, and a relay operates identical to the MIMO protocol, however the source in a second time slot does not operate.

FIG. 1 part iii) relates to a MISO protocol. A source in a first time slot transmits a first symbol to a relay, the source in a second time slot retransmits the first symbol, and the relay transmits the symbol, received in the first time slot, to a destination by applying the AF function or the DF function.

As shown in Equation 1, the MIMO protocol has an advantage of having a twice the transmission rate of the SIMO protocol and the MISO protocol.

$$y_{R,1} = h_{SR} x_1 + n_{R,1}$$

$$y_{D,1} = h_{SD} x_1 + n_{D,1}$$

$$y_{D,2} = h_{RD} \hat{x}_1 + h_{SD} x_2 + n_{D,2}$$ [Equation 1]

Equation 1 indicates input/output equations in a relay and a destination with respect to the MIMO protocol using the DF system. The S, R and D in Equation 1 respectively indicates a source, a relay and a destination, and the subscripts "1" and "2" indicate a time slot. Also, y indicates a receiving signal, x indicates an input signal, h indicates a channel value, n indicates white noise, and $\hat{x}_1$ indicates a decoded symbol.

$$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} x_1 \\ x_2 \end{bmatrix} + \begin{bmatrix} n_{D,1} \\ n_{D,2} \end{bmatrix}$$ [Equation 2]

$$\rightarrow Y = Hx + N$$

When Equation 1 is represented into a matrix, Equation 1 is represented as Equation 2. In Equation 2, when the relay decodes the symbol to $x_1$ via a perfect decoding process, '$\hat{x}_1 = x_1$' may be tenable. Accordingly, the MIMO protocol may configure a virtual MIMO channel environment as shown in Equation 2.

In Equation 2, conversely, a conventional MIMO system, one of the channel values of the channel matrix H becomes '0', subsequently full diversity gain may not be acquired. Only a first order diversity in the virtual MIMO channel environment by the MIMO protocol may be gained due to the '0' channel value even if a signal-to-noise ratio with respect to a link between the source and the relay is greater.

Accordingly, a new relay system which can constellation rotate a channel value by multiplying the constellation with a predetermined matrix, and thereby may acquire full diversity gain when configuring a virtual MIMO equivalence channel, is required.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a constellation relay system and a constellation relay method which induces a channel in a channel matrix to prevent a '0' value by constellation rotating a symbol, transmitted from a source, when configuring a virtual MIMO channel.

An aspect of exemplary embodiments of the present invention also provides a constellation relay system and a constellation relay method which can induce a channel in a channel matrix to prevent a '0' value by constellation rotating the channel, used in transmitting the symbol to a destination, and acquiring full diversity gain.

An aspect of exemplary embodiments of the present invention also provides a constellation relay system and a constellation relay method which can acquire both a higher data transmission rate and full diversity gain by compensating for a decrease of diversity gain of a protocol whose data transmission rate is comparatively greater with constellation rotation, and subsequently, performance of a relay network may be enhanced.

According to an aspect of exemplary embodiments of the present invention, there is a constellation rotation relay system including a matrix creator for creating a symbol matrix by configuring a symbol transmitted in parallel from a source of a relay network; and a constellation rotation unit for constellation rotating the symbol in the symbol matrix by adding a constellation rotation matrix to the created symbol matrix.

According to another aspect of exemplary embodiments of the present invention, there is a constellation rotation relay system including a matrix creator creating a channel matrix by configuring a link channel, used by the symbol to be transmitted in parallel to the destination of the relay network; and a constellation rotation unit constellation rotating a channel in the channel matrix by adding a constellation rotation matrix to the created channel matrix.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which:

FIG. 3 parts i) and ii) are diagrams illustrating an example of creating matrixes of a matrix creator according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
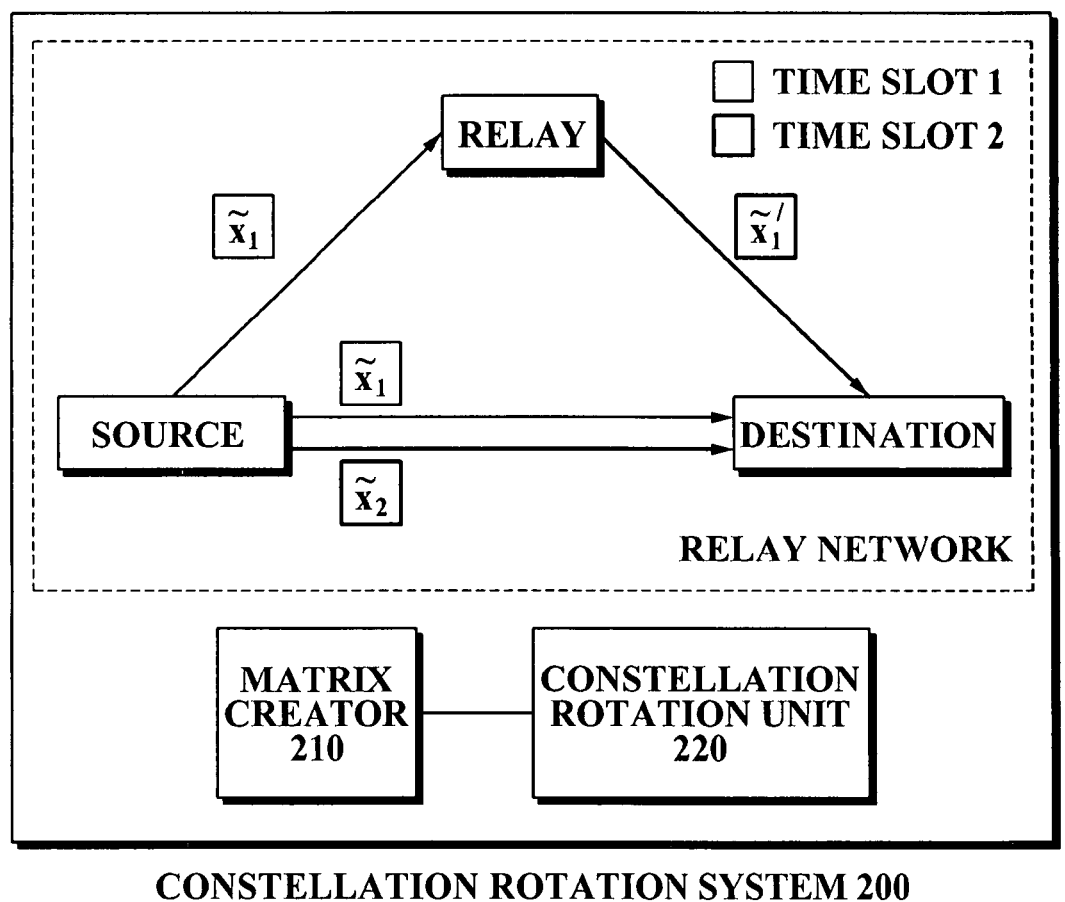
FIG. 2 is a diagram illustrating a specific configuration of a constellation rotation relay system according to an exemplary embodiment of the present invention.

FIG. 2 is a diagram illustrating a specific configuration of a constellation rotation relay system 200 according to an exemplary embodiment of the present invention.

A relay network source includes a source, a relay, and a communication node of a destination, and is used to transmit a symbol from the source to the destination, located in a shadow area, via cooperation with the relay.

Via the relay network, the symbol, transmitted from the source, may be transmitted to an area where service would not be available with a conventional art, and subsequently cell coverage, i.e. an area where a communication service is available, may be widely expanded.

The constellation rotation relay system 200 includes a function that allows for a continuous communication service with signal processing among the source in the relay network, the relay and the destination, and a function that constellation rotates a link of a channel, which is used in the symbol or in transmitting the symbol. The constellation rotation excludes a '0' as a channel value for a channel matrix, which is created in association with an input and an output of the symbol in the destination, and subsequently may acquire full diversity gain in the relay network, when configuring a virtual MIMO channel.

The constellation rotation relay system 200 includes a matrix creator 210 and a constellation rotation unit 220.

Figure 1:
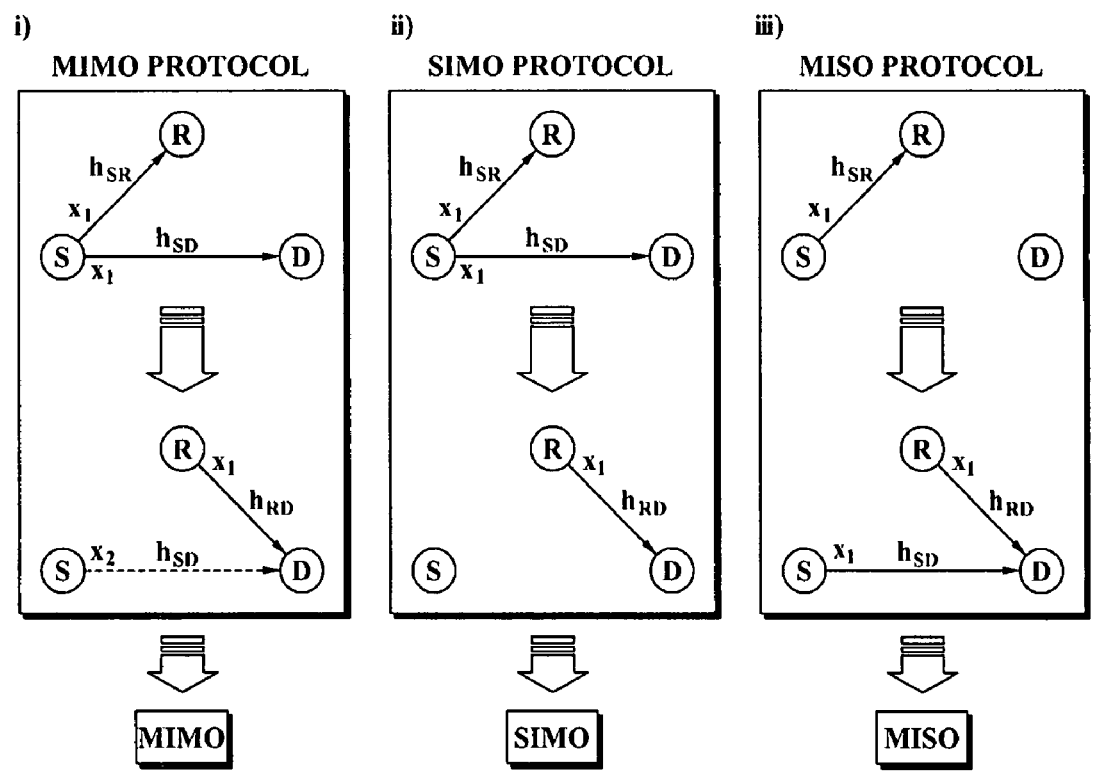
FIG. 1 parts i), ii), and iii) are diagrams illustrating examples of protocols applied to a relay network according to related art.

FIG. 1 parts i), ii), and iii) are diagrams illustrating examples of a protocol applied to a relay network according to a related art.

The constellation rotation relay system 200 may be embodied in a plurality of exemplary embodiments with respect to constellation rotation, depending on a location of a communication node to which a constellation matrix is added for constellation rotation.

Described below with reference to FIG. 2, is the scenario where a source is the communication node where the constellation rotation matrix is added. Since constellation rotation is performed at the communication node where the constellation rotation matrix is added, here constellation rotation is performed at the source.

The source performs sequential processes to transmit the symbol to the relay or the destination in a wireless environment, e.g. a modulation process and an amplification process with respect to the symbol.

The matrix creator 210 performs the sequential processes to create a symbol matrix by configuring the symbol, transmitted in parallel from the source of the relay network. Namely, the matrix creator 210 arranges the symbol to create a matrix, based on a time slot transmitting single independent information. Specifically, the source may transmit a symbol $x_1$ in a first time slot and transmit a symbol $x_2$ in a second time slot, and the matrix creator 210 creates a symbol matrix $$\begin{bmatrix} x_1 \\ x_2 \end{bmatrix},$$

by configuring the symbol in parallel.

The constellation rotation unit 220 constellation rotates the symbol in the symbol matrix by adding a constellation rotation matrix to the created symbol matrix. Namely, the constellation rotation unit 220 may provide an environment preventing a '0' value for a channel in a channel matrix to be created in association with input/output of a symbol in a subsequent destination, by performing a constellation rotation process with respect to the symbol transmitted from the source.

There are $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix}$$

in the present specification as examples of the constellation rotation matrix to be added to the symbol matrix, the constel lation rotation unit 220 selects an optimal constellation rotation matrix depending on a system environment among $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix}.$$

The constellation rotation unit 220 may select the variable ρ by considering a bit energy to a noise ratio, or a bit error rate (BER) when $$\frac{1}{\sqrt{1+\rho^2}} \begin{bmatrix} \rho & 1 \\ -1 & \rho \end{bmatrix}$$

is selected as the constellation rotation matrix. It is desirable that the constellation rotation unit 220 selects the variable ρ as '2.05' by analyzing a parameter in the constellation rotation matrix, showing superior second order diversity, when calculating with the channel matrix.

As described above, the constellation rotation unit 220 performs constellation rotation with respect to the symbol by multiplying the selected constellation rotation matrix $$\Theta\left(\begin{bmatrix} \theta_{11} & \theta_{12} \\ \theta_{21} & \theta_{22} \end{bmatrix}\right)$$

to a left side of the symbol matrix $$\begin{bmatrix} x_1 \\ x_2 \end{bmatrix}.$$

Namely, the constellation rotation unit 220 may convert the symbol matrix $$\begin{bmatrix} x_1 \\ x_2 \end{bmatrix}$$

into the constellation rotated symbol matrix $$\begin{bmatrix} \tilde{x}_1 \\ \tilde{x}_2 \end{bmatrix}.$$

Accordingly, the symbol constellation rotated in the first time slot $\tilde{x}_1$ is transmitted from the source to the relay and the destination, and the symbol $\tilde{x}_2$ constellation rotated in the second time slot is transmitted to the destination. Additionally, the relay generates the symbol $\tilde{x}_1'$ by performing decoding/re-encoding $\tilde{x}_1$, and transmits to the generated symbol $\tilde{x}_1'$ to the destination in the second time slot.

With respect to the symbol transmission, equations associated with input/output in the destination may be represented as, '$y_{D,1} = h_{SD} * \tilde{x}_1 + n_{D,1}$' in the first time slot, and '$y_{D,2} = h_{RD} * \tilde{x}_1' + h_{SD} * \tilde{x}_2 + n_{D,2}$' in the second time slot. In this instance, y indicates a signal associated with reception in the destination, h indicates a channel value of the link, and n indicates white noise in the destination.

Namely, the destination in the first time slot receives the constellation rotated symbol $\tilde{x}_1$ through a link $h_{SD}$ connected to the source, and the destination in the second time slot receives the constellation rotated symbol $\tilde{x}_2$ through a link $h_{SD}$ connected to the source and the symbol $\tilde{x}_1'$ through a link $h_{RD}$ connected to the relay.

Since the constellation rotated symbol $\tilde{x}_1$ is perfectly decoded/re-encoded by the relay, when it is assumed that the symbol $\tilde{x}_1'$ is identical to the constellation rotated symbol $\tilde{x}_1$, input/output equations in the second time slot may be represented as, '$y_{D,2} = h_{RD} * \tilde{x}_1 + h_{SD} * \tilde{x}_2 + n_{D,2}$'.

Under this assumption, the matrix creator 210 creates a channel matrix by configuring a link channel in parallel, the link channel being used by the constellation rotated symbols $\tilde{x}_1$ and $\tilde{x}_2$ to be transmitted to the destination of the relay network.

The equation associated with the input/output equations in the first and second time slots may be represented as a matrix $$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} \tilde{x}_1 \\ \tilde{x}_2 \end{bmatrix} + \begin{bmatrix} n_{D,1} \\ n_{D,2} \end{bmatrix},$$

and the matrix creator 210 creates $$\begin{bmatrix} h_{SD} & 0 \\ h_{RD} & h_{SD} \end{bmatrix}$$

associated with the link channel into a channel matrix.

Also, the constellation rotation unit 220 constellation rotates the channel in the channel matrix into another value except for '0' by considering the constellation rotated symbol. Specifically, the constellation rotation unit 220 interprets the constellation rotated symbol $$\begin{bmatrix} \tilde{x}_1 \\ \tilde{x}_2 \end{bmatrix} \text{ as } \Theta \begin{bmatrix} x_1 \\ x_2 \end{bmatrix},$$

adds the constellation rotation matrix Θ to the channel matrix $$\begin{bmatrix} h_{SD} & 0 \\ h_{RD} & h_{SD} \end{bmatrix},$$

and subsequently performs the constellation rotation process for the channel matrix.

Specifically, the constellation rotation unit 220 interprets $$\begin{bmatrix} h_{SD} & 0 \\ h_{RD} & h_{SD} \end{bmatrix} \begin{bmatrix} \tilde{x}_1 \\ \tilde{x}_2 \end{bmatrix} \text{ as } \begin{bmatrix} h_{SD} & 0 \\ h_{RD} & h_{SD} \end{bmatrix} \Theta \begin{bmatrix} x_1 \\ x_2 \end{bmatrix},$$

through a matrix calculation of the channel matrix $$\begin{bmatrix} h_{SD} & 0 \\ h_{RD} & h_{SD} \end{bmatrix}$$

with the constellation rotated channel matrix $$\begin{bmatrix} \tilde{h}_{11} & \tilde{h}_{12} \\ \tilde{h}_{21} & \tilde{h}_{22} \end{bmatrix}.$$

Accordingly, the constellation rotation unit 220 enables the channel in the channel matrix to have another value excluding '0'.

Equations associated with the above described constellation rotation for the channel matrix are represented as $$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} \tilde{x}_1 \\ \tilde{x}_2 \end{bmatrix} + \begin{bmatrix} n_{D,1} \\ n_{D,2} \end{bmatrix}$$

$$= \begin{bmatrix} h_{SD} & 0 \\ h_{RD} & h_{SD} \end{bmatrix} \Theta \begin{bmatrix} x_1 \\ x_2 \end{bmatrix} + \begin{bmatrix} n_{D,1} \\ n_{D,2} \end{bmatrix}$$

$$= \begin{bmatrix} \tilde{h}_{11} & \tilde{h}_{12} \\ \tilde{h}_{21} & \tilde{h}_{22} \end{bmatrix} \begin{bmatrix} x_1 \\ x_2 \end{bmatrix} + \begin{bmatrix} n_{D,1} \\ n_{D,2} \end{bmatrix}.$$

Accordingly, the constellation rotation system 200 of an exemplary embodiment of the present invention which induces a channel in a channel matrix to prevent a '0' value by constellation rotating a symbol, transmitted from a source, when configuring a virtual MIMO channel, and have full diversity gain.

Also, according to an exemplary embodiment of the present invention, both gain of a higher data transmission rate and full diversity gain may be acquired by compensating for a decrease of diversity gain of a protocol whose data transmission rate is comparatively greater with constellation rotation, and subsequently performance of a relay network may be enhanced.

Described below is another exemplary embodiment of the present invention, wherein a destination is the communication node where constellation rotation is performed.

Initially, the matrix creator 210 creates a channel matrix by configuring a link channel in parallel, the link channel being used by a constellation rotated symbol to be transmitted to the destination of the relay network. Namely, the matrix creator 210 checks input/output in the destination in association with symbol transmission from the source or the relay, and creates the channel matrix using the checked input/output equations. Hereinafter, creation of the matrixes by the matrix creator 210 is described by referring to FIG. 3.

FIG. 3 parts i) and ii) are diagrams illustrating an example of creating matrixes of a matrix creator 210 of FIG. 2.

In FIG. 3 part i), a symbol is transmitted between a source and a destination, the source and a relay, and the relay and the destination according to the MIMO protocol described in FIG. 1.

The source performs processes to transmit the symbol to the relay or the destination in a wireless environment, e.g. a modulation process and an amplification process. Hereinafter, the source may transmit the modulated symbol to the relay or the destination depending on a predetermined transmission request.

As shown in FIG. 3 part i), the source according to the MIMO protocol respectively transmits the symbol $x_1$ to the relay and the destination in a first time slot. In this instance, input/output equations in the destination in the first time slot in association with the symbol transmission may be represented as, '$y_{D,1} = h_{SD}*x_1 + n_{D,1}$'. Namely, the destination in the first time slot receives only the symbol $x_1$ through a link $h_{SD}$ connected to the source. In this instance, $n_{D,1}$ may indicate white noise generated in the destination in the first time slot.

In the second time slot, the source transmits the symbol $x_2$ to the destination in a second time slot, and the relay may transmit the symbol $\tilde{x}_1$, transmitted from the source, to the destination after improving the quality of the symbol $\tilde{x}_1$ by an amplify-and-forward (AF) function or a decode-and-forward (DF) function.

With respect to the symbol transmission, input/output equations associated with input/output in the destination may be represented as, '$y_{D,2} = h_{RD}*x_1 + h_{SD}*x_2 + n_{D,2}$'. Specifically, the destination in the second time slot receives the symbol $x_1$ through the link $h_{SD}$ connected to the source and the link $h_{RD}$ connected to the relay. In this instance, $n_{D,2}$ may indicate white noise which occurs in the destination in the second time slot.

In FIG. 3 ii), the input/output equations in each time slot may be represented as a matrix type similar to a matrix before constellation rotation.

Namely, the input/output equations associated with the destination for each time slot are represented as '$y_{D,1} = h_{SD}*x_1 + n_{D,1}$' and '$y_{D,2} = h_{RD}*x_1 + h_{SD}*x_2 + n_{D,2}$', and this may be configured as $$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} x_1 \\ x_2 \end{bmatrix} + \begin{bmatrix} n_{D,1} \\ n_{D,2} \end{bmatrix}$$

in parallel by the matrix creator 210.

Specifically, the matrix creator 210 of FIG. 2 creates a channel matrix $$\begin{bmatrix} h_{SD} & 0 \\ h_{RD} & h_{SD} \end{bmatrix}$$

by converting the input/output equations into a matrix type in the destination in association with the symbol transmission.

Referring back to FIG. 2, the constellation rotation unit 220 constellation rotates the channel in the channel matrix by adding the constellation rotation matrix to the created symbol matrix. Specifically, the constellation rotation unit 220 converts the channel in the channel matrix into another value except for '0' through the constellation rotation by the constellation rotation matrix, and subsequently the channel matrix may be configured as a full matrix type.

There are $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix}$$

in the specification as examples of the constellation rotation matrix, and the constellation rotation unit 220 selects an optimal constellation rotation matrix according to a system environment among $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix}.$$

The constellation rotation unit 220 may select the variable ρ by considering a bit energy to a noise ratio, or a BER when $$\frac{1}{\sqrt{1+\rho^2}} \begin{bmatrix} \rho & 1 \\ -1 & \rho \end{bmatrix}$$

is selected as the constellation rotation matrix. It is desirable that the constellation rotation unit 220 selects the variable ρ as '2.05' by analyzing a parameter in the constellation rotation matrix, showing superior second order diversity, when calculating with the channel matrix.

In FIG. 3 part ii), after constellation rotation, a predetermined constellation rotation matrix Θ, selected by the constellation rotation unit 220, is added to a right side of the channel matrix $$\begin{bmatrix} h_{SD} & 0 \\ h_{RD} & h_{SD} \end{bmatrix}.$$

Namely, the constellation rotation unit 220 may acquire a channel matrix $$\begin{bmatrix} \tilde{h}_{11} & \tilde{h}_{12} \\ \tilde{h}_{21} & \tilde{h}_{22} \end{bmatrix}$$

by multiplying the constellation rotation matrix Θ with the channel matrix $$\begin{bmatrix} h_{SD} & 0 \\ h_{RD} & h_{SD} \end{bmatrix}.$$

Thus, according to an exemplary embodiment of the present invention, the constellation rotation system 200 of FIG. 2 may induce a channel in a channel matrix to prevent a '0' value for the channel, used in transmitting a symbol to a destination, when configuring a virtual MIMO channel, and full diversity gain may be acquired.

Also, according to an exemplary embodiment of the present invention, both gain of a higher data transmission rate and full diversity gain may be acquired by compensating for a decrease of diversity gain of a protocol whose data transmission rate is comparatively greater with constellation rotation, and subsequently, performance of a relay network may be enhanced.

Hereinafter, an operation flow of the constellation rotation system 200 is described in detail.

Figure 4:
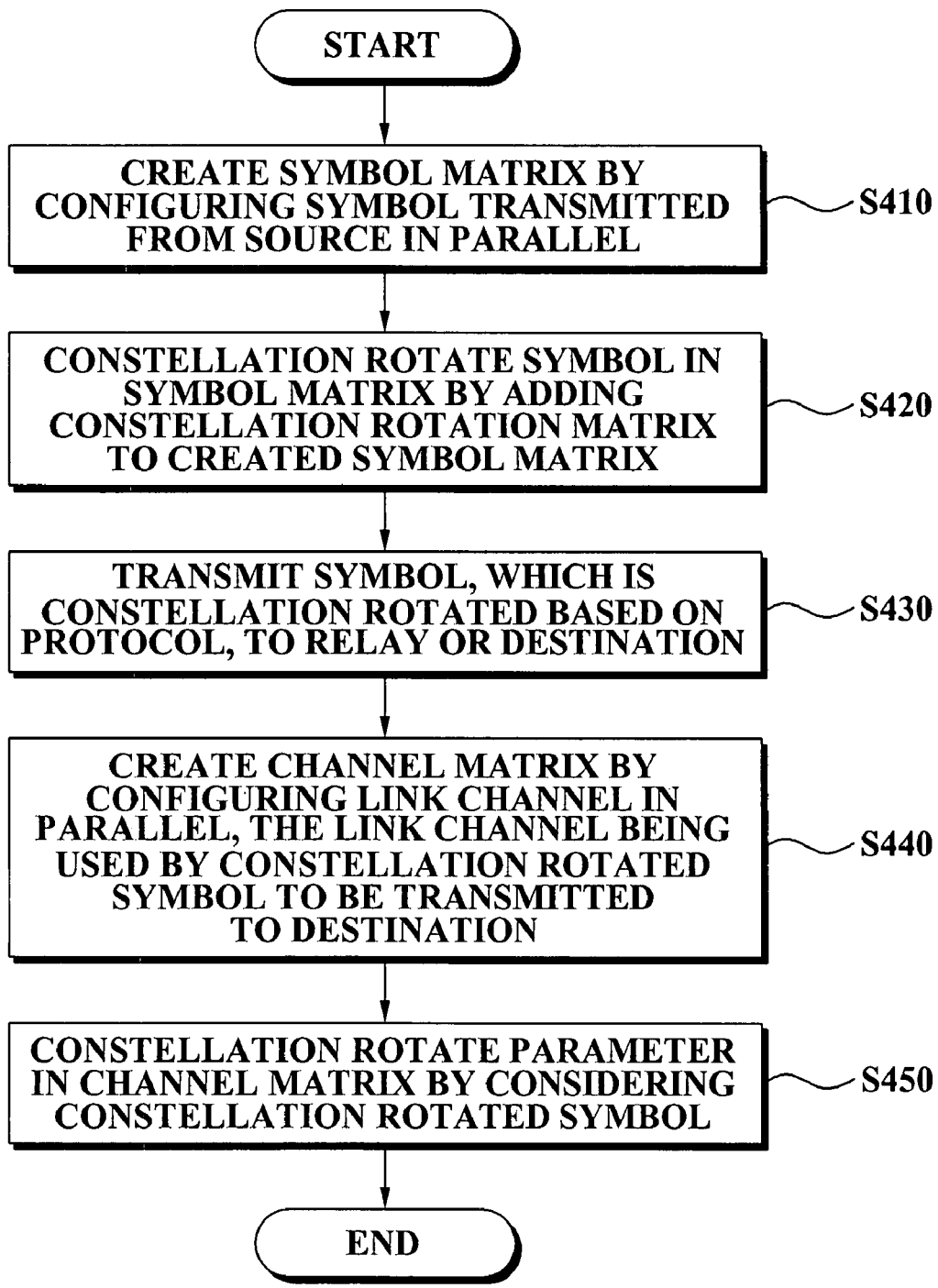
FIG. 4 is a flowchart illustrating a constellation rotation relay method according to an exemplary embodiment of the present invention.

FIG. 4 is a flowchart illustrating a constellation rotation relay method according to an exemplary embodiment of the present invention.

The constellation rotation method may be performed by the above described constellation rotation system 200.

In operation S410, the constellation rotation system 200 creates a symbol matrix by configuring a symbol, transmitted from a source of a relay network, in parallel. In operation S410, the source performs sequential processes to transmit the symbol to a relay or a destination in a wireless environment, and the symbol matrix is created by configuring the symbol in parallel based on a time slot. Specifically, the source may transmit a symbol $x_1$ in a first time slot and transmit a symbol $x_2$ in a second time slot, and the constellation rotation relay system 200 creates the symbol matrix $$\begin{bmatrix} x_1 \\ x_2 \end{bmatrix}$$

by configuring the symbol in parallel.

In operation S420, the constellation rotation relay system 200 constellation rotates the symbol in the symbol matrix by adding a constellation rotation matrix to the created symbol matrix. Operation S420 enables the channel in the channel matrix to be created in association with an input/output of a symbol in a subsequent destination to prevent a '0' value by performing the constellation rotation process with respect to the symbol transmitted from the source.

In operation S420, the constellation rotation system 200 may select any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix}$$

as the constellation rotation matrix to be added to the symbol matrix.

The constellation rotation relay system 200 may select the variable ρ by considering a bit energy to a noise ratio, or a BER when $$\frac{1}{\sqrt{1+\rho^2}} \begin{bmatrix} \rho & 1 \\ -1 & \rho \end{bmatrix}$$

is selected as the constellation rotation matrix. It is desirable that the constellation rotation relay system 200 selects the variable ρ as '2.05' by analyzing a parameter in the constellation rotation matrix, showing superior second order diversity, when calculating with the channel matrix.

Namely, the constellation rotation relay system 200 may convert the symbol matrix $$\begin{bmatrix} x_1 \\ x_2 \end{bmatrix}$$

into the constellation rotated symbol matrix $$\begin{bmatrix} \tilde{x}_1 \\ \tilde{x}_2 \end{bmatrix}$$

by performing constellation rotation by multiplying the constellation rotation matrix by the symbol matrix.

In operation S430, the constellation rotation relay system 200 transmits the constellation rotated symbol to the relay or the destination from the source based on a predetermined protocol. Specifically, in operation S430, the constellation rotation relay system 200 may transmit the symbol $\tilde{x}_1$, constellation rotated in a first time slot, from the source to the relay and the destination, and transmit the symbol $\tilde{x}_2$, constellation rotated in a second time slot, from the source to the destination. Additionally, the relay generates a re-encoded symbol $\tilde{x}_1'$ by performing decoding/re-encoding of the constellation rotated symbol $\tilde{x}_1$ in a DF operation, and transmits the symbol $\tilde{x}_1'$ generated in the second time slot to the destination.

In operation S440, the constellation rotation relay system 200 creates a channel matrix by configuring a link channel, used by the constellation rotated symbol to be transmitted to the destination of a relay network, in parallel. In the operation S440, with respect to the symbol transmission, the channel matrix associated with the link channel is created by representing input/output equations in the destination as a matrix. Specifically, the constellation rotation relay system 200 creates $$\begin{bmatrix} h_{SD} & 0 \\ h_{RD} & h_{SD} \end{bmatrix}$$

associated with the link channel as the channel matrix when the input/output equations in the destination are represented as $$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} \tilde{x}_1 \\ \tilde{x}_2 \end{bmatrix} + \begin{bmatrix} n_{D,1} \\ n_{D,2} \end{bmatrix},$$

In operation S450, the constellation rotation relay system 200 constellation rotates the channel in the channel matrix into another value except for '0' according to the constellation rotated symbol. Specifically, the constellation rotation relay system 200 interprets the constellation rotated symbol $$\begin{bmatrix} \tilde{x}_1 \\ \tilde{x}_2 \end{bmatrix} \text{ as } \Theta \begin{bmatrix} x_1 \\ x_2 \end{bmatrix},$$

adds the constellation rotation matrix $\Theta$ to the channel matrix $$\begin{bmatrix} h_{SD} & 0 \\ h_{RD} & h_{SD} \end{bmatrix},$$

and subsequently performs the constellation rotation process for the channel matrix.

According to the constellation rotation, the constellation rotation relay system 200 may convert the channel matrix $$\begin{bmatrix} h_{SD} & 0 \\ h_{RD} & h_{SD} \end{bmatrix}$$

into the constellation rotated channel matrix $$\begin{bmatrix} \tilde{h}_{11} & \tilde{h}_{12} \\ \tilde{h}_{21} & \tilde{h}_{22} \end{bmatrix},$$

and consequently the channel in the channel matrix may have another value except for '0'.

Accordingly, the constellation rotation relay system 200 of an exemplary embodiment of the present invention may induce a channel in a channel matrix to prevent a '0' value by constellation rotating a symbol, transmitted from the source, when configuring a virtual MIMO channel, and full diversity gain is acquired.

Also, the constellation rotation relay system 200 of an exemplary embodiment of the present invention may acquire both gain of a higher data transmission rate and full diversity gain by compensating for a decrease of diversity gain of a protocol whose data transmission rate is comparatively greater with constellation rotation, and subsequently performance of a relay network may be enhanced.

Figure 5:
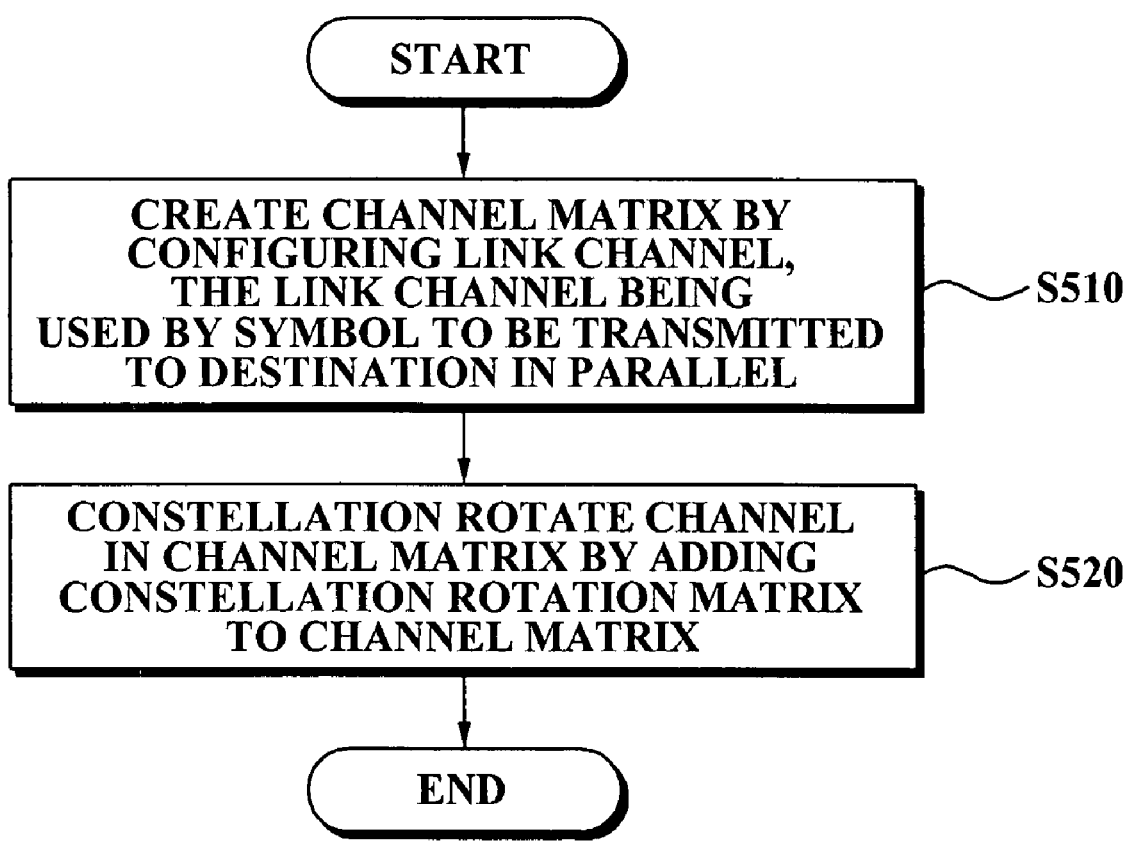
FIG. 5 is a flowchart illustrating a constellation rotation relay method according to another exemplary embodiment of the present invention.

FIG. 5 is a flowchart illustrating a constellation rotation relay method according to another exemplary embodiment of the present invention.

Operations of the constellation rotation relay system 200 described with reference to FIG. 5 are for the scenario where a destination is the communication node where a constellation rotation matrix is added.

In operation S510, the constellation rotation relay system 200 creates a channel matrix by configuring a link channel in parallel, the link channel being used by a symbol to be transmitted to a destination of a relay network. The operation S510 checks an input/output in the destination in association with a symbol transmission from a source or a relay, and creates the channel matrix using the checked input/output. Specifically, when the input/output equations in each time slot are represented as '$y_{D,1} = h_{SD} * x_1 + n_{D,1}$' and '$y_{D,2} = h_{RD} * x_1 + h_{SD} * x_2 + n_{D,2}$', the constellation rotation relay system 200 converts the input/output equations into a matrix type $$\begin{bmatrix} y_{D,1} \\ y_{D,2} \end{bmatrix} = \begin{bmatrix} h_{SD} & 0 \\ h_{RD} & h_{SD} \end{bmatrix} \begin{bmatrix} x_1 \\ x_2 \end{bmatrix} + \begin{bmatrix} n_{D,1} \\ n_{D,2} \end{bmatrix}$$

by configuring the input/output equations in parallel. Accordingly, the constellation rotation relay system 200 may create $$\begin{bmatrix} h_{SD} & 0 \\ h_{RD} & h_{SD} \end{bmatrix}$$

as the channel matrix.

In operation S520, the constellation rotation relay system 200 constellation rotates the channel in the channel matrix by adding the constellation rotation matrix to the created channel matrix. Accordingly, the constellation rotation relay system

200 may overcome a problem with the conventional art, in which only first order diversity is acquired, since the constellation rotation relay system 200 converts the channel in the channel matrix into another value except for '0' through the constellation rotation.

In the operation S520, the constellation rotation relay system 200 may select an optimal constellation rotation matrix among $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}} \begin{bmatrix} \rho & 1 \\ -1 & \rho \end{bmatrix},$$

the variable ρ indicating '2.05'.

Specifically, the constellation rotation relay system 200 may acquire the constellation rotated channel matrix $$\begin{bmatrix} \tilde{h}_{11} & \tilde{h}_{12} \\ \tilde{h}_{21} & \tilde{h}_{22} \end{bmatrix}$$

by adding a predetermined constellation rotation matrix Θ to a right side of the channel matrix $$\begin{bmatrix} h_{SD} & 0 \\ h_{RD} & h_{SD} \end{bmatrix},$$

and consequently the channel matrix becomes a full matrix, without a '0' channel.

Thus, according to an exemplary embodiment of the present invention, the constellation rotation relay system 200 may induce a channel in a channel matrix not to have a '0' value by constellation rotating a channel, used in transmitting to the destination, when configuring a virtual MIMO channel, and full diversity gain is acquired.

Also, the constellation rotation relay system 200 of an exemplary embodiment of the present invention may acquire both gain of a higher data transmission rate and full diversity gain by compensating for a decrease of diversity gain of a protocol whose data transmission rate is comparatively greater with constellation rotation, and subsequently performance of a relay network may be enhanced.

The constellation rotation relay method according to the above-described exemplary embodiment of the present invention may be recorded in computer-readable storage media including program instructions to implement various operations embodied by a computer. The storage media may also include, alone or in combination with the program instructions, data files, data structures, and the like. Examples of computer-readable storage media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The constellation relay method may also be embodied in transmission media such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, there is provided a constellation relay system and a constellation relay method which induces a channel in a channel matrix to prevent a '0' value by constellation rotating a symbol, transmitted from a source, when configuring a virtual MIMO channel.

Also, according to an exemplary embodiment of the present invention, there is provided a constellation relay system and a constellation relay method which induces a channel in a channel matrix to prevent a '0' value by constellation rotating the channel, used in transmitting the symbol to a destination, when configuring a virtual MIMO channel, and acquiring full diversity gain.

Also, according to an exemplary embodiment of the present invention, there is provided a constellation relay system and a constellation relay method which can acquire both gain of a higher data transmission rate and full diversity gain by compensating for a decrease of diversity gain of a protocol whose data transmission rate is comparatively greater with constellation rotation, and subsequently performance of a relay network may be enhanced.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A constellation rotation relay system comprising:
a matrix creator for creating a symbol matrix comprising a first symbol to be transmitted during a first time slot and a second symbol to be transmitted during a second time slot, such that the first symbol and the second symbol are arranged in parallel in the symbol matrix; and
a constellation rotation unit for constellation rotating the symbols in the symbol matrix to convert the symbol matrix into a constellation rotated symbol matrix to prevent a '0' value for a channel in a channel matrix to be created in association with input/output of a symbol in a subsequent destination,
wherein the matrix creator creates a channel matrix by configuring a parallel link channel for transmitting the constellation rotated symbols to a destination of the relay network, and the constellation rotation unit constellation rotates a channel in the channel matrix into another value except for 0 by considering the constellation rotated symbol, and
wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and

-continued
$$\frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

2. A constellation rotation relay system comprising:
a matrix creator for creating a channel matrix that is based on a symbol matrix that comprises a first symbol to be transmitted during a first time slot and a second symbol to be transmitted during a second time slot, wherein the first symbol and the second symbol are arranged in parallel in the symbol matrix, and based on a link channel on which the symbols are to be transmitted; and
a constellation rotation unit for constellation rotating a channel in the channel matrix to acquire a constellation rotated channel matrix $$\begin{bmatrix} \tilde{h}_{11} & \tilde{h}_{12} \\ \tilde{h}_{21} & \tilde{h}_{22} \end{bmatrix}$$

by adding a constellation rotation matrix to a right side of the channel matrix $$\begin{bmatrix} h_{SD} & 0 \\ h_{RD} & h_{SD} \end{bmatrix}$$

and consequently the channel matrix becomes a full matrix, without a '0' channel,
wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

3. The system of claim 2, wherein the symbol to be transmitted to the destination corresponds to $x_1$ through a link $h_{SD}$, which links a source of the relay network to the destination, in a first time slot, and
corresponds to $x_2$ through the link $h_{SD}$, and $x_1$ through a link $h_{RD}$ which links a relay of the relay network to the destination, in a second time slot.

4. The system of claim 3, wherein the matrix creator creates $$\begin{bmatrix} h_{SD} & 0 \\ h_{RD} & h_{SD} \end{bmatrix}$$

as the channel matrix when an output of the destination associated with the symbol corresponds to '$y_{D,1}=h_{SD}*x_1$' in the first time slot, and corresponds to '$y_{D,2}=h_{RD}*x_1+h_{SD}*x_2$' in the second time slot.

5. A constellation rotation relay method comprising:
creating a symbol matrix comprising a first symbol to be transmitted during a first time slot and a second symbol to be transmitted during a second time slot, such that the first symbol and the second symbol are arranged in parallel in the symbol matrix; and
constellation rotating the symbols in the symbol matrix to convert the symbol matrix into a constellation rotated symbol matrix to prevent a '0' value for a channel in a channel matrix to be created in association with input/output of a symbol in a subsequent destination,
creating a channel matrix by configuring a parallel link channel for transmitting the constellation rotated symbols to a destination of the relay network, and
constellation rotating a channel in the channel matrix into another value except for 0, according to the rotated constellation,
wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

6. A constellation rotation relay method comprising:
creating a channel matrix that is based on a symbol matrix that comprises a first symbol to be transmitted during a first time slot and a second symbol to be transmitted during a second time slot, wherein the first symbol and the second symbol are arranged in parallel in the symbol matrix, and based on a link channel on which the symbols are to be transmitted; and
constellation rotating a channel in the channel matrix to acquire a constellation rotated channel matrix $$\begin{bmatrix} \tilde{h}_{11} & \tilde{h}_{12} \\ \tilde{h}_{21} & \tilde{h}_{22} \end{bmatrix}$$

by adding a constellation rotation matrix to a right side of the channel matrix $$\begin{bmatrix} h_{SD} & 0 \\ h_{RD} & h_{SD} \end{bmatrix},$$

and consequently the channel matrix becomes a full matrix, without a '0' channel,
wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix},$$

and $$\frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

7. The method of claim 6, wherein the symbol to be transmitted to the destination corresponds to $x_1$ through a link $h_{SD}$, which links a source of the relay network to the destination, in a first time slot, and corresponds to $x_1$ through a link $h_{RD}$, which links $x_2$ through the link $h_{SD}$ and a relay of the relay network to the destination.

8. The method of claim 7, wherein the creating of the matrix comprises creating $$\begin{bmatrix} h_{SD} & 0 \\ h_{RD} & h_{SD} \end{bmatrix}$$

as the channel matrix when an output of the destination associated with the symbol corresponds to '$y_{D,1}=h_{SD}*x_1$' in the first time slot, and corresponds to '$y_{D,2}=h_{RD}*x_1+h_{SD}*x_2$' in the second time slot.

9. A non-transitory computer-readable storage medium storing a program for implementing a constellation rotation relay method comprising:

creating a symbol matrix comprising a first symbol to be transmitted during a first time slot and a second symbol to be transmitted during a second time slot, such that the first symbol and the second symbol are arranged in parallel in the symbol matrix; and constellation rotating the symbols in the symbol matrix to convert the symbol matrix into a constellation rotated symbol matrix to prevent a '0' value for a channel in a channel matrix to be created in association with input/output of a symbol in a subsequent destination, creating a channel matrix by configuring a parallel link channel for transmitting the constellation rotated symbols to a destination of the relay network, and constellation rotating a channel in the channel matrix into another value except for 0, according to the rotated constellation, wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix}, \text{ and } \frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

10. A source node for transmitting data to a destination node, the source node comprising:

a matrix creator for creating a symbol matrix comprising a first symbol to be transmitted during a first time slot and a second symbol to be transmitted during a second time slot, such that the first symbol and the second symbol are arranged in parallel in the symbol matrix; and a constellation rotation unit for constellation rotating the symbols in the symbol matrix to convert the symbol matrix into a constellation rotated symbol matrix to prevent a '0' value for a channel in a channel matrix to be created in association with input/output of a symbol in a subsequent destination, wherein the constellation rotation unit determines the constellation rotation matrix as any one of $$\begin{bmatrix} 1 & 0 \\ 0 & 1 \end{bmatrix}, \begin{bmatrix} 1 & e^{j\pi/4} \\ 1 & -e^{j\pi/4} \end{bmatrix}, \text{ and } \frac{1}{\sqrt{1+\rho^2}}\begin{bmatrix} \rho & 1 \\ -1 & \rho \end{bmatrix},$$

where ρ is a numerical value based on a bit energy to noise ratio or a bit error rate (BER).

11. The source node of claim 10, further comprising a transmitter to transmit the constellation rotated first symbol to a relay node and to a destination node.

12. The source node of claim 11, wherein the transmitter transmits the constellation rotated second symbol to the destination node.

13. The source node of claim 10, wherein the symbol matrix comprises $$\begin{bmatrix} x_1 \\ x_2 \end{bmatrix},$$

and the constellation rotated symbol matrix comprises $$\begin{bmatrix} \tilde{x}_1 \\ \tilde{x}_2 \end{bmatrix}.$$

14. The source node of claim 10, wherein the matrix creator is further configured to create a channel matrix based on the symbol matrix and based on a link channel on which the symbols are to be transmitted, and the constellation rotation unit is further configured to constellation rotate the created channel matrix.

\* \* \* \* \*